United States Patent [19]

Wavish

[11] Patent Number: 4,922,430

[45] Date of Patent: May 1, 1990

[54] METHOD AND APPARATUS FOR CONTROLLING THE MOVEMENT OF A GUIDED OBJECT

[75] Inventor: Peter R. Wavish, West Hoathly, England

[73] Assignee: U.S. Philips Corporation, New York, N.Y.

[21] Appl. No.: 115,476

[22] Filed: Oct. 30, 1987

[51] Int. Cl.$^5$ .......................... B25J 9/00; G06F 15/50
[52] U.S. Cl. .................................... 364/461; 364/559; 364/513; 901/16; 901/18
[58] Field of Search ...................... 364/461, 559, 513; 901/10, 16, 17, 18

[56] References Cited

U.S. PATENT DOCUMENTS

| | | | |
|---|---|---|---|
| 3,902,972 | 11/1975 | Corwin, Jr. et al. | 364/513 |
| 4,028,533 | 6/1977 | Matsubara | 364/513 |
| 4,063,073 | 12/1977 | Strayer | 364/461 |
| 4,578,757 | 3/1986 | Stark | 364/513 |
| 4,638,445 | 1/1987 | Mattaboni | 364/513 |
| 4,727,471 | 2/1988 | Driels et al. | 364/559 |

Primary Examiner—Parshotam S. Lall
Assistant Examiner—V. N. Trans
Attorney, Agent, or Firm—Thomas A. Briody; Jack E. Haken; Anne E. Barschall

[57] ABSTRACT

A method is provided for controlling the movement of an object 1, 61, in an environment 64. The method involves making predictions of collisions, given the outlines of the object and the environment, so that avoiding action can be taken. The object and environment are modelled as clusters of interpenetrating spherical bubbles, the model comprising the relative positions of the centers 6, 7, 8, 9, and 21 to 28 inclusive of the bubbles and their respective radii. The model simplifies the prediction of the point of collision of two such modelled objects by examining the collisions between bubbles only. An early, safe, approximate prediction of the collision can be obtained using Newton's approximation.

10 Claims, 3 Drawing Sheets

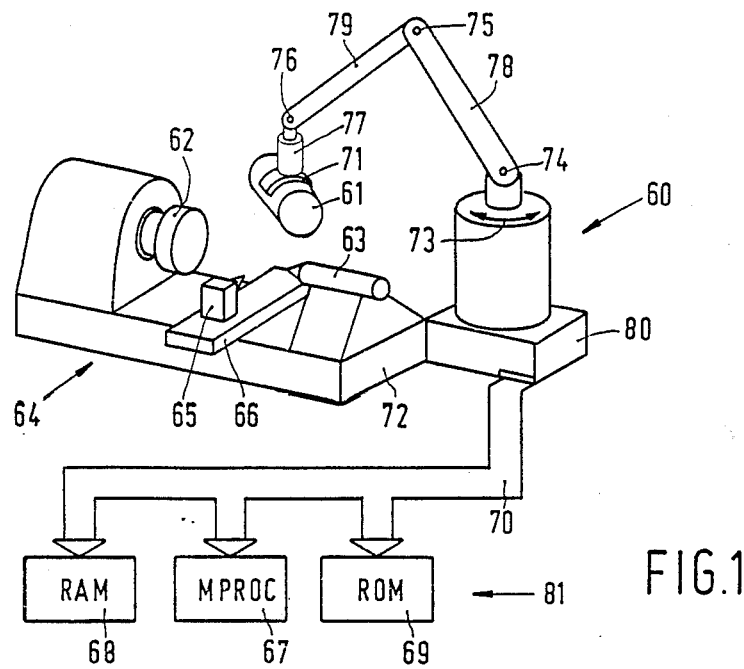
FIG.1
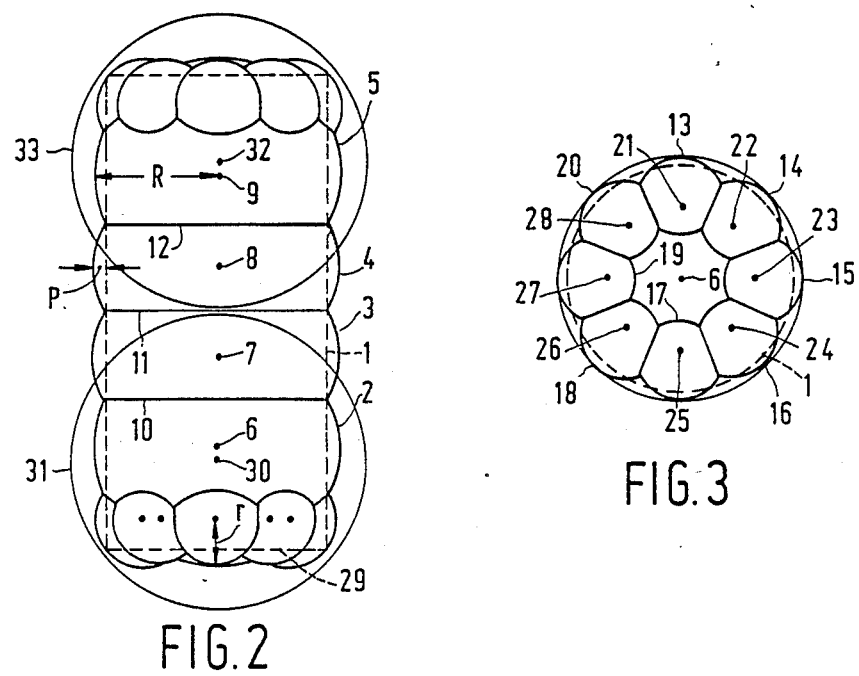
FIG.2
FIG.3

METHOD AND APPARATUS FOR CONTROLLING THE MOVEMENT OF A GUIDED OBJECT

BACKGROUND OF THE INVENTION

The invention relates to a method for controlling a movement of a guided object in an environment to avoid collision with another object. The method comprises making predictions of a collision ahead of occurrence of the collision, given the geometrical outlines of all objects involved, their relative positions, and their trajectories in an immediate future. Each object is represented by at least one spherical bubble of known radius and centre position. The bubble contains at least partially the geometrical outline of the object. At least one object is represented by a cluster of interpenetrating spherical bubbles of at least two different radii. The outermost surface of the cluster contains the outermost surface of the object. The collision between objects is predicted as a first estimated point of touch to occur between any bubble of the cluster with a bubble representing another object. Such a method is known from European Patent Application 87198, U.S. Pat. No. 4,578,757 which is incorporated herein by reference.

In considering the problem of collision prediction, it might be assumed that it would be helpful to restrict the shape of objects so that all objects were built up from simple geometric solids i.e. blocks, cylinders and spheres. On closer examination, however, it turns out that, while these primitive shapes are simple in a geometric sense, collisions between these shapes are surprisingly complex. For example in a collision between a cube and a cylinder, the following five distinct kinds of collision are possible.

(1) Corner point hits planar surface.
(2) Corner point hits curved surface.
(3) Edge line hits curved surface.
(4) Edge line hits circular edge line.
(5) Planar face hits circular edge line.

Other very unlikely kinds of collision, such as a vertex of the cube hitting a circular edge line of the cylinder are regarded as limiting cases of one of the above kinds of collision.

The reference provides a simple, regular, general way of representing the shape of an object which simplifies the collision prediction.

Thus the collision problem reduces to finding the earliest pair of bubbles to collide. The time and place of a collision between two bubbles can be found easily and exactly provided both bubbles are travelling with uniform velocity. The time at which the collision occurs is found by solving a quadratic equation having time as the independent variable. This equation has two roots. If they are imaginary, no collision occurs. Otherwise, the roots correspond to two times, and the earlier of these is the required answer. The later time is the time at which the bubbles would part again supposing that, instead of behaving like solid objects and colliding, they had passed through each other without deviating from their courses.

Objects may not travel at uniform velocity because they can rotate and are subject to gravity and other forces. However, the constant velocity assumption may be sufficient for short-term predictions, which is the main concern in simulating the relative movement of objects.

The representation of an object may be effected fully or partly. In the latter case the representation must be done as far as necessary, in that an actual collision would always be preceded by a collision with a representing bubble. In practice, one object could be represented by a single bubble. Alternatively, both or all objects are represented by a cluster of a plurality of bubbles.

The prediction of the collision of two clusters of bubbles will involve a computation time proportional to the product of the numbers of bubbles in the two clusters. If there are 100 bubbles in each of two clusters, then 10,000 computations are needed.

SUMMARY OF THE INVENTION

It is an object to reduce the amount of computation while necessitating very little extra computational machinery. In accordance with one feature of the invention, it is characterized in that the cluster comprises at least one spherical guard bubble. Each guard bubble contains a selection of the bubbles of that cluster. In that any guard bubble from the cluster is examined for collision before further cluster bubbles are examined.

Thus a guard bubble is an imaginary bubble drawn around and completely enclosing a selected group of bubbles of the cluster. If there is no collision between guard bubbles, none of the further bubbles of the one or two clusters need be tested for collision, thereby avoiding computation for all those bubbles. If there is a collision between, for example, just two guard bubbles, only the bubbles in these two guard bubbles are involved in the collision computation. It should be noted that a collision between guard bubbles does not imply that there is a collision between the cluster bubbles. Subsequent examination of cluster bubbles may reveal that there is no collision.

FURTHER ASPECTS OF THE INVENTION

In accordance with a further feature, the invention is characterized in that the cluster comprises a succession of levels of guard bubbles. Each guard bubble of the innermost level contains a selection of the cluster bubbles such that the guard bubbles of the innermost level contain, between them, all the bubbles of the cluster and such that each bubble is assigned to only one innermost guard bubble. Each guard bubble of a given level outside the innermost level encloses a selection of the guard bubbles of the adjacent inner level such that the guard bubbles of the given level contains, between them, all the guard bubbles of the adjacent inner level and such that a guard bubbles of the adjacent inner level is assigned to only one guard bubble of the given level. A guard bubble may also contain all the bubbles of the cluster. Such a guard bubble then represents any object as a sphere which completely encloses the object.

No bubble lies partly outside the guard bubble to which it is assigned and a bubble is only assigned to one guard bubble, otherwise absence of collision with a guard bubble would not rule out collision with the bubbles within that guard bubble. A pair of guard bubbles of a given level may overlap and both may contains parts of, or even all of, some of the inner bubbles. But each inner bubble is normally assigned to only one of the guard bubbles which completely encloses it.

To see how the amount of computation is reduced, consider first the question of whether a point is inside a cluster, If the point lies outside the outermost guard bubble, that is the bubble surrounding the entire cluster, it cannot possibly lie inside the cluster itself. If it does lie inside the cluster guard bubble, then the same logic can be applied to each bubble at the next inner level, and so on until the surface bubbles are reached. In most cases, since a cluster typically occupies only a small region of space, and most clusters will be nowhere near each other, the computation will terminate after the outermost guard bubbles have been inspected.

The argument applies to the problem of whether two clusters will collide. If their guard bubbles do not collide, the clusters cannot possibly collide. If the guard bubbles do collide, then the next inner level is examined, and so on. For most objects the question of whether they collide can be answered very rapidly, usually at the level of the outermost containing guard bubble.

Moving inwardly from level to level of guard bubbles, the successive levels represent the object with increasing precision. Also, at any level, the object is represented by a minimum amount of information sufficient for the purpose at that level.

Another answer to the problem of the large number of computations required is simply to use fast array processing hardware. This situation where the same simple calculation is required to be performed on a large amount of data is well suited to this class of hardware.

It will be seen from the detailed description of an embodiment of the invention that the calculation for collision between bubbles means finding the separation between bubbles and this involves the solution of a right-angled triangle which entails finding the square root of the difference of the squares of two sides of the triangle. The computer time involved in finding a square root is very much longer than the time taken to perform additions and multiplications. Since the prediction collision time between bubbles is an early prediction of the actual collision between objects, an early approximation to the time of collision between bubbles may be an acceptable alternative, particularly if it avoids a square root calculation.

In accordance with a further feature, the invention is characterized in that the collision calculation comprises calculating the trajectory of a bubble of the representation of the guided object relative to a bubble of a representation of another object for a limited period of time as a straight line approximation at constant velocity, deriving an equation giving the square of the separation of the bubbles as a function of time during the limited period and calculating the time of collision of the bubbles as an early approximate solution of the equation by applying Newton's method of successive approximation.

If straight line relative motion between the bubbles at constant velocity is assumed, then the equation expressing the square of the separation of the bubbles as a function of time is a simple quadratic equation and is therefore a parabola when graphed. The exact solution of the equation is given by the intersection of the graph with the time axis when the separation is zero and when collision would occur between the bubbles. It will be recalled that Newton's approximation involves selecting a first approximate solution, drawing a tangent to the graph at this point, and finding where the tangent intersects the horizontal axis which gives an improved approximate solution. The slope of the parabola is a simple linear function of time which is easy to calculate. The calculation of the improved approximation only involves simple arithmetic operations, no square root being involved. In this case, the first approximate solution can be the present time. It is important to note that, with a parabolic curve, the improved solution will always be at a time earlier than the time at which the bubbles would actually collide. The approximate solutions found therefore always provide safe estimates of the time of collision. Newton's method may be repeated to find a more exact solution. But, given that the assumed straight line motion is itself an approximation for a limited time ahead, the time of collision may be calculated as the first approximate solution given by Newton's method. Thus the calculation time using Newton's method is markedly reduced as compared with finding the exact solution by square root extraction.

In accordance with another aspect, the invention provides an apparatus for controlling the movement of a guided object in an environment to avoid collision with another object, comprising movement means for guiding the guided object in the environment, means for measuring the position of the guided object relative to any other object, information storage means for storing the shape and size of the guided object and for storing the location, shape and size of any other object, and calculation means for taking the measured position of the guided object and the stored information on the guided object and on any other object, calculating a collision-free path for the guided object, and outputting control information to the movement means to realize said collision-free path, wherein the stored information on each object comprises at least one spherical bubble of known radius and centre position which contains at least partially the geometrical outline of that object, at least one object being represented by a cluster of interpenetrating spherical bubbles of at least two different radii, the outermost surface of the cluster containing the outermost surface of the object in question, and wherein the collision between objects is predicted as the first estimated point of touch to occur between any bubble of the cluster representing one object with a bubble representing another object, characterized in that the cluster comprises at least one spherical guard bubble, any guard bubble containing a selection of the bubbles of that cluster, and in that any guard bubble from the cluster is examined for collision before further cluster bubbles are examined. The movement means will typically be a robot manipulator arm which also contains the means for measuring the position of a gripper on the arm which holds the object. Also, such a robot arm contains means for responding to digital input information to product a desired movement of the gripper. The calculation means will typically be a computer programmed to carry out the calculations and having a store to carry the information relating to the objects and the environment.

Further aspects of the invention are recited in dependent claims.

BRIEF DESCRIPTION OF THE FIGURES

Embodiment of the invention will now be described, by way of example, with reference to the accompanying drawings in which, FIG. 1 shows a cylindrical object being moved by a robot arm relative to a lathe in accordance with the invention, FIGS. 2 and 3 show side and end views of a cluster of bubbles representing a cylinder.

DESCRIPTION OF A MANIPULATOR SYSTEM

Figure 4:
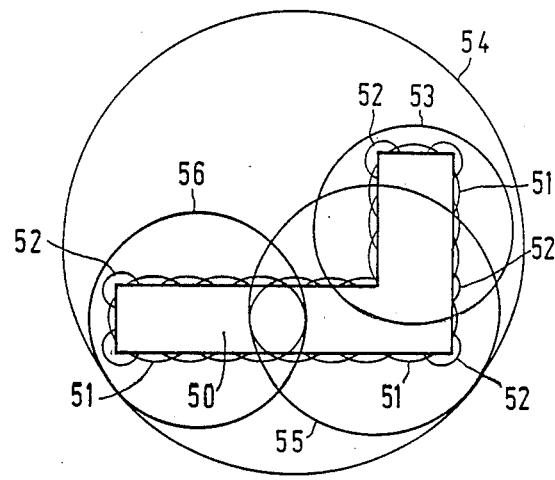
FIG. 4 shows an L-shaped object represented by a cluster of bubbles and also by two levels of guard bubbles.

Referring to FIG. 1, a robot manipulator 60 is shown in the process of moving a cylindrical object 61, a workpiece to be turned, into position between the headstock 62 and tailstock 63 of a lathe 64. In the course of making the movement, collisions are avoided between object 61 and the parts of the lathe, including a toolpost 65 on a saddle 66, by means of a collision avoidance method to be described. The movements of the robot manipulator are made under the control of calculation means 81 comprising a microprocessor 67, a read only memory 69 and a random access memory 68 connected to one another and to the robot manipulator by a data bus bar 70. The robot manipulator has means for measuring the position of the gripper 71 relative to the bed 72 of the lathe, and hence relative to all parts of the lathe. This measurement means comprises digital angle transducers at the waist axis 73, the shoulder, elbow and wrist joints 74, 75 and 76 respectively, and the gripper rotation device 77. These angle measurements, combined with stored information in the robot on the waist height, the length of upper and lower arms 78 and 79 respectively and the wrist length, enable an on-board computer 80 of the robot to calculate the position of object 61 relative to the lathe 64. These calculations are well-known in the art of robotics and will not be described further.

DESCRIPTION OF A PREFERRED EMBODIMENT

In accordance with the invention, the collision prediction calculations are made using representations of the objects involved as clusters of interpenetrating spherical bubbles. Referring to FIGS. 2 and 3, a side view and an end view are shown of a cluster of spherical bubbles representing a right cylinder. In both views the cylinder 1 is shown as a dotted outline, the bubble outlines and lines of intersection being shown as solid lines. Owing to the geometrical simplicity of the object being represented, only two sizes of bubbles are required to achieve the degree of representational precision required in this case.

The main body of the cylinder 1 is represented by four major interpenetrating spherical bubbles 2, 3, 4 and 5 of equal radius R, their centres 6, 7, 8 and 9 respectively being arranged at regular intervals on a straight line. In FIG. 2 the line of intersection of these found bubbles appear as straight lines 10, 11 and 12, though these lines are an edge-on view of the circles of intersection of the bubbles. The radii of the bubbles and the separation of their centres are chosen so that the circles of intersection lie in the surface of the cylinder, the bubbles projecting beyond the spheres by an amount P. The end faces of the cylinder are represented by a ring of eight minor regularly spaced interpenetrating bubbles 13 to 20 inclusive of equal radius r, their centres 21 to 28 inclusive being arranged at regular intervals around a circle, as shown in the end view of FIG. 3. The end face 29 of the cylinder is contained within the combination of major end bubble 2 and the minor bubbles 13 to 20 inclusive. The representation of cylinder 1 consists of the relative positions of the centres of the twenty bubbles of the cluster together with the radius of each bubble.

The representational precision of the cluster could be improved by reducing the radius of the major bubbles slightly, i.e. reducing P, and using a greater number of major bubbles packed more closely together to represent the cylindrical surface. Greater numbers and a variety of smaller sizes of minor bubbles would be needed to approximate the flat end and sharp edge of the cylinder with increased precision. However, the representation still consists of a list of the relative coordinates of the bubble centres in an approximate system of axes together with the radius of each bubble.

As has been noted above in the preamble of this specification, the amount of calculation to be done in predicting a collision is proportional to the product of the numbers of bubbles in the two clusters. The amount of calculation can be greatly reduced in most practical situations by the use of guard bubbles which enclose a selection of the cluster bubbles and by testing for a collision between guard bubbles of the two clusters first. If no collision between guard bubbles is detected, no reference need be made to the cluster bubbles.

FIG. 4 shows, as an example, an L-shaped body having two levels of guard bubbles. The cluster representing the body 50 is composed of twelve major bubbles 51 and six minor bubbles 52, five of which enclose corners of the body and one of which fills in a gap between two major bubbles on the long vertical side of the body. A first level of three guard bubbles 53, 55 and 56 are shown which, between them, not only enclose the body but also all the bubbles of the cluster. The first level guard bubbles interpenetrate one another to provide the complete enclosure of body and cluster. Each first level guard bubble encloses a selection of the bubbles. As an example, guard bubbles 55 and 56 overlap. In the region of their overlap, two bubbles 51 overlap, one of these bubbles 51 being completely enclosed by guard bubble 55 and the other bubble 51 being completely enclosed by guard bubble 56. Thus all of the bubbles 51 of a selection are assigned to and completely by only one of the guard bubbles of the next outer level. Finally, a single guard bubble 54 at a second outermost level encloses all three guard bubbles 53, 55 and 56.

If two bodies are to be moved in proximity to one another, each may be represented by a cluster of bubbles and by a succession of levels of guard bubbles terminating in a single guard bubble enclosing all bubbles. As noted above the collision prediction calculation is carried out initially on the outermost guard bubbles of the two clusters. If a collision is detected between these guard bubbles only the next level down of guard bubbles needs to be examined. For example, if two FIG. 4 objects are in proximity to one another and the outer most guard bubbles indicate collision, only nine calculations have to be carried out since there are only three lower level guard bubbles in each cluster. If the cluster bubbles had been examined there would have been 18×18 or 324 calculations needed. Thus there is considerable benefit in representing the object at lower definition by another set of fewer, larger, bubbles, the guard bubbles. Only when the two objects are close will the cluster bubbles have to be examined for collision.

Returning to FIG. 2, another example of the use of guard bubbles is shown. Guard bubbles 31 and 33, having centres 30 and 32 respectively, each enclose one of the rings of eight minor bubbles representing the cylinder end faces. In a collision calculation only these two end guard bubbles 31 and 33 and the four major bubbles 2, 3, 4 and 5 need be interrogated initially, reducing the number of collision calculations by 14 in most cases.

Figure 5:
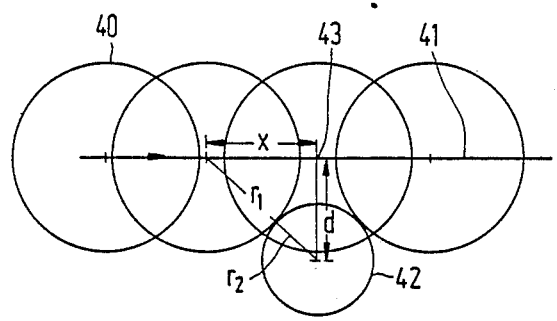
FIG. 5 illustrates the geometry at the point of collision of two bubbles.

FIG. 5 shows the geometry which exists at the moment of collision between two bubbles, which can either be isolated single bubbles or which can each be a bubble from the two clusters representing the objects. A first bubble 40, radius $r_1$, is shown moving along a straight line path 41 relative to a second bubble 42, radius $r_2$. From the known trajectory of bubble 40, the distance of closest approach d of the bubble centres can be calculated. Distance x along the path 41 is measured from the point of closest approach 43 and will be known in advance as a function of time.

At collision, $x^2 + d^2 = (r_1 + r_2)^2$ from which: $x = \pm((r_1+r_2)^2 - d^2)^{\frac{1}{2}}$     (1)

If d is greater than $r_1+r_2$, the roots of equation (1) are imaginary, no collision occurring. If d is less than $r_1+r_2$, the roots are real, the negative root giving the value of x, and hence the time, at which collision occurs. The positive root gives the value of x and the time at which the bubbles part if they had passed through one another instead of behaving like solid objects and had collided.

To assess the point of collision of two objects, the above calculation is repeated for every pair of bubbles, taken one each from the clusters representing the object, at intervals of time between which a proposed motion is substantially linear. Since the relative positions and radii of all bubbles are known at any time during the proposed relative movement of the clusters, the first collision between a pair of bubbles can be detected in advance of an actual collision occurring between the real objects and appropriate evasive action taken.

Figure 7:
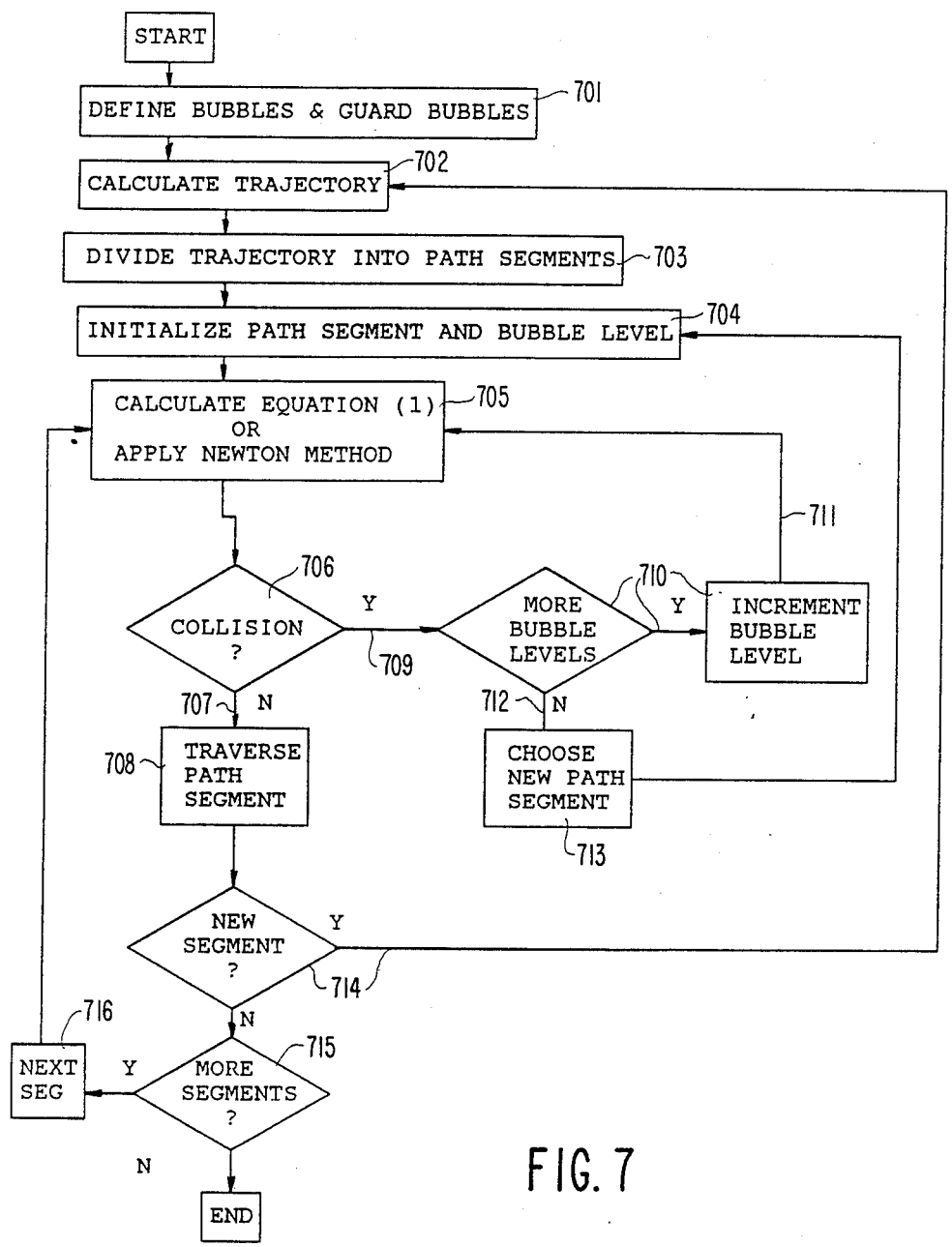
FIG. 7 is a flow chart describing the use of hierarchy of guard buble levels to avoid collision.

Returning to the situation depicted in FIG. 1 and FIG. 7, the cylindrical workpiece 61 is represented 701 by a cluster of interpenetrating spherical bubbles, for example the cluster shown in FIGS. 2 and 3. The geometrical outlines of the headstock 62, the tailstock 63, the toolpost 65 and the saddle 66 are each represented by an appropriate cluster of interpenetrating spheres. The sets of bubble radii, their relative positions in each cluster together with the positions of the clusters relative to one another and to a coordinate system of the robot manipulator are stored in the real only memory 69. Also stored in ROM 69 are the initial and desired final positions and orientations of the workpiece 61. ROM 69 also contains a program for calculating an initial trajectory 702 for the workpiece 61 to pass from its initial to its final position regardless of the positions of the lathe parts.

ROM 69 also contains a program for dividing the initial trajectory into a sequence of straigth line approximations, or path segments 703, which are traversed by object 61 at constant velocity. Equation (1) calculation is then carried out 705 at the beginning of each path segment 715,716 for an overall guard bubble 704 for object 61 in relation to an overall guard bubble for each of the lathe parts. If no collision 706 is indicated 707, the segment is actually traversed 708 by the object moved by the robot manipulator acting on numerical instructions provided by the calculating means 81. If a collision is indicated, the calculations are repeated for the next lower level 711 of guard bubbles. If no collision is indicated, the segment is traversed, otherwise the next lower level, which may be the defining cluster, are investigated. If a collision is still indicated between a bubble of the cluster representing the cylinder and a bubble of the cluster representing a lathe part, the position of the potential collision is recorded and a new path segment calculated 713 lying away from the lathe part in the direction of the line joining the centre of the lathe part bubble with the recorded point of potential collision. The collision calculations are then repeated by the new path segment and, in the absence of collision indications, the new path segment is traversed 708. At the end of the new segment 714 a new trajectory is calculated to reach the final position which new trajectory is divided into linear path segment approximations as before.

Thus, encounters between part 61 and the lathe parts are anticipated and a path reaching the final position without collisions is obtained.

An alternative method of calculating the collision time between two bubbles, which avoids the use of the square root operation and which is hence much shorter in computer time, is to use Newton's approximation to find an approximate solution, and then iterate to find the exact solution to the required accuracy. The key observation is that the answer given by Newton's approximation will always be a time that is earlier than the real time of collision, if the spheres are going to collide at all. Therefore the computations of the earliest pair of spheres to collide can be done using the approximate solutions rather than the exact solutions. Having found the estimated time of the earliest collision, the process can be repeated to converge on the actual time of collision.

Figure 6:
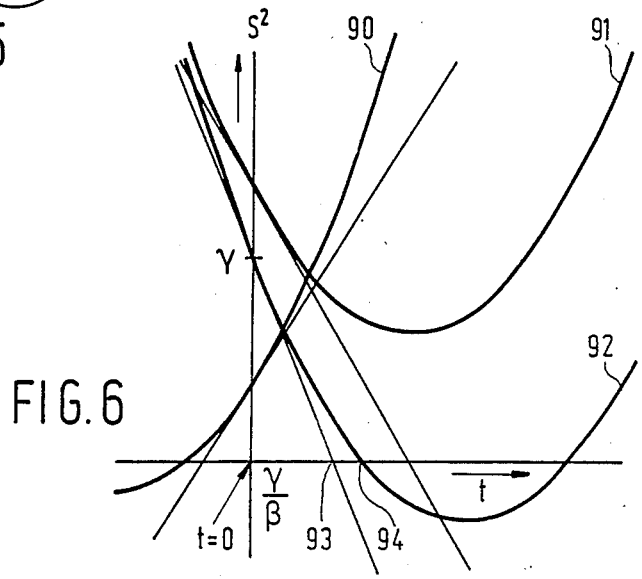
FIG. 6 illustrates the use of Newton's approximation in calculating a prediction of the collision of two spheres.

In FIG. 6, three spheres 90, 91, 92, are represented as seen by a fourth sphere travelling away from one and towards the other two. The vertical dimension is distance squared, so the parabola meet the X axis, the left hand point in each case representing the point of collision. Newton's approximation projects the slope of the curve at the current time t=0 down onto the X axis to give an approximate value 93 for the time of collision. Note that because of the shape of a parabola, this time is guaranteed to be before the real time of collision, 94.

The square of the separation S between two spheres as a function of time t, assuming that the relative motion of the spheres is linear and at constant velocity, can be expressed as a quadratic function, $$S^2 = \alpha t^2 + \beta t + \delta \quad (2)$$

FIG. 6 shows $S^2$ as a function of t for three spheres. At t=0, the intercept with the vertical axis is $\delta$. The slope of the function (2) is found by differentiating (2) with respect to t, $$\frac{d(S^2)}{dt} = 2\alpha t + \beta$$

At $t = 0$ $$\frac{d(S^2)}{dt} = \beta$$

From this it follows that the first approximate solution to the intersection of the parabola with the t axis, i.e. the collision time $t_1$ of the spheres, is given by: $t_1 = \delta/\beta$.

The following language C function, stored as a program in ROM 69 of FIG. 1, computes the approximate time of collision between two spheres in the way described above:

```
collide (a,b,c,d,e,f,r1,g,h,i,j,k,l,r2,offset,t)
double a,b,c,d,e,f,g,h,i,j,k,l;
double r1,r2,offset;
float *t;
(
  double slope, gamma, half_beta;
  half_beta=(a−g)*(d−j)+(b−h)*(e−k)+(-
    c−i)*(f−l);
  slope=half_beta+half_beta−offset;
  if (slope>=0.0) return(−1);
    /* no collision; also prevents divide by zero */
  gamma=(d−j)*(d−j)+(e−k)-
    *(e−k)+(f−l)*(f−l)−(r1+r2)+(r1+r2);
  *t=0.0−gamma/slope;
  return(0);
)
```

The coordinates of the centers of the spheres are (a*t+d,b*t+e,c*t+f) and (g*t+j,h*t+k,i*t+l), their radii are r1 and r2, offset is a value which if it is greater than zero allows for small departures from linear motion, and t is the predicted time of collision.

This function, Newton's approximation, does not compute the exact time of collision, but a time which is guaranteed to be just before the actual time of collision. To find out when the representations of two solid bodies would collide, this function is applied to all possible pairs of spheres, one in each body, and the minimum value of t is found. To find the exact time of collision, the equations of motion are re-computed and the process is repeated to find a better estimate of the collision time. Successive iterations normally converge rapidly on the required collision time.

The advantage of this method compared with simply solving the quadratic equation is that less computation is required to prove that two objects do not collide within a given time interval. When looking ahead only a short period of time, there will often be no collision, so a single iteration is sufficient to prove that the earliest time of collision is after the end of the current interval. If a collision is predicted before the end of the current interval, an accurate solution for the time of collision, if needed, will require iteration.

Within a given time interval, only a certain number of collisions will be predicted, which may be collisions between guard bubbles as well as collisions between surface bubbles. The smaller the time interval, the smaller are the numbers of collisions that will be predicted. This fact can be turned to advantage in computing the actual time of collision by the successive approximation method described above. As the computation converges on a solution, the time of the collision is known more and more accurately, so the time period during which a collision is sought can be reduced. Fewer pairs of bubbles need to be considered than might at first appear likely.

From reading the present disclosure, other modifications will be apparent to persons skilled in the art. Such modifications may involve other features which are already known in the design, manufacture and use of robotic systems and collision avoidance devices and component parts thereof and which may be used instead of or in addition to features already described herein. Although claims have been formulated in this application to particular combinations of features, it should be understood that the scope of the disclosure of the present application also includes any novel feature or any novel combination of features disclosed either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further applications derived therefrom.

What is claimed is:

1. A method for controlling a movement of a first object with respect to a second object, said method comprising the steps of:
   (a) first representing at least part of a geometrical outline of said second object by a first set of interpenetrating spherical bubbles that each contain a fraction of said part and which together contain all of said part;
   (b) second representing said first set by a second set of spherical bubbles that contains the bubbles of said first set and have larger diameters than the bubbles of said first set, so that said second set contains less bubbles than said first set; and
   (c) calculating the movement of said first object for predicting an impending collision with said second object comprising:
      (i) first determining whether there is an impending penetration of any bubble of said second set; and
      (ii) in case of a positive outcome of said first determining step, second determining whether there is a further impending penetration of any bubble of said first set,
   whereby a number of calculations is reduced in case of a negative outcome of said second determining step.

2. The method of claim 1 comprising the further step of
   (a) third representing at least part of a geometrical outline of said first object by at least one spherical bubble.

3. A method for controlling a movement of a first object with respect to a second object, said method comprising the steps of:
   (a) first representing at least part of a geometrical outline of said first object by a first set of interpenetrating spherical bubbles that each contain a fraction of said part and which together contain all of said part;
   (b) second representing said first set by a second set of spherical bubbles that contain the bubbles of said first set and have larger diameters than the bubbles of said first set, so that said second set contains less bubbles than said first set; and
   (c) calculating the movement of said first object for predicting an impending collision with said second object comprising:
      (i) first determining whether there is an impending penetration of any bubble of said second set; and
      (ii) in case of a positive outcome of said first determining step, second determining whether there is a further impending penetration of any bubble of said first set,
   whereby a number of calculations is reduced in case of a negative outcome of said second determining step.

4. The method of claim 1 or 3 wherein
(a) said second representing step comprises representing said second set by a hierarchy of levels of guard bubbles including a first level of guard bubbles which contain the bubbles of the first set and have larger diameters than the bubbles of the first set and at least one second level of at least one guard bubble that contains the guard bubbles of said first level, each of the at least one guard bubble of said at least one second level having a larger diameter than the guard bubbles of said first level, so that each guard bubble of the second level encloses a selection of the guard bubbles of a respective adjacent inner level, and so that all the guard bubbles of any given level of the second level contain, between them all the guard bubbles of the respective adjacent inner level and so that each guard bubble of the respective adjacent inner level is assigned to only one guard bubble of the given level, so that at each level of said hierarchy there are less bubbles than at a next level of said hierarchy; and
(b) said first determining step comprises:
  (i) first deciding whether there is an impending penetration of an outermost level of said hierarchy;
  (ii) upon a positive result, second deciding whether there is a further impending penetration of any bubble of the next level of said hierarchy; and
  (iii) repeating said second deciding step, until there is no impending penetration or until the first set is reached,
whereby a number of calculations is reduced upon a negative result of said first or second deciding step.

5. The method of claim 3 comprising the further step of
(a) representing at least part of a geometrical outline of said second object by at least one spherical bubble.

6. A method as claimed in claim 2 or 5, wherein each determining step comprises:
(a) calculating a trajectory of a first bubble representing the first object, relative to a second bubble representing the second object, for a limited period of time as a straight line approximation at constant velocity,
(b) deriving an equation giving the square of the separation of the first and second bubbles as a function of time during the limited period, and
(c) calculating the time of a collision as an early approximate solution of the equation by applying Newton's method of successive approximations.

7. A method as claimed in claim 6, wherein the time of a collision is calculated as the first approximate solution given by Newton's method.

8. Appparatus for controlling movement of a first object with respect to a second object said apparatus comprising
(a) means for guiding the first object relative to the second object;
(b) means for storing respective shape and size information for each of the first and second objects, said shape and size information including, for a respective at least one of said first and second objects:
  (i) data defining a first set of interpenetrating spherical bubbles that each contain a fraction of a part of a geometrical outline of the respective at least one object, such that the spherical bubbles together contain all of said part;
  (ii) data defining a second set of spherical bubbles that contain the bubbles of said first set and have larger diameters than the bubbles of said first set, so that said second set contains less bubbles than said first set; and
(c) means for calculating the movement of said first object for predicting an impending collision with said second object the calculating including:
  (i) first determining whether there is an impending penetration of any bubble of said second set; and
  (ii) in case of a positive outcome of said first determining step, second determining whether there is a further impending penetration of any bubble of said first set,
whereby a number of calculations is reduced in case of a negative outcome of said second determining step.

9. The apparatus of claim 8 wherein
(a) the second set includes a hierarchy of levels of guard bubbles including:
  (i) a first level of guard bubbles that contain the bubbles of the first set and have larger diameters than the bubbles of the first set; and
  (ii) at least one second level of at least one guard bubble that contains the guard bubbles of said first level and has a larger diameter than the guard bubbles of said first level, so that each guard bubble of the second level encloses a selection of the guard bubbles of a respective adjacent inner level, and so that all the guard bubbles of any given level of the second level contain, between them all the guard bubbles of the respective adjacent inner level, and so that each guard bubble of the respective adjacent inner level is assigned to only one guard bubble of the given level, so that at each level of said hierarchy there are less bubbles than at a next level of said hierarchy;
(b) said calculating means, as part of said first determining:
  (i) first decides whether there is an impending penetration of an outermost level of said hierarchy;
  (ii) upon a positive result, second decides whether there is a further impending penetration of any bubble of a next level of said hierarchy; and
  (iii) repeats the second deciding, until there is no impending penetration or until the first set is reached,
whereby a number of calculations is reduced upon a negative result of said first or second deciding step.

10. The apparatus of claim 8 wherein
(a) said shape and size information includes, for each object, at least one respective spherical bubble; and
(b) the calculating means, for each determining:
  (i) calculates a trajectory of a first bubble representing the first object, relative to a second bubble representing the second object, for a limited period of time as a straight line approximation at constant velocity;
  (ii) derives an equation giving the square of the separation of the first and second bubbles as a function of time during the limited period; and
  (iii) calculates the time of a collision as an early approximate solution of the equation by applying Newton's method of successive approximations.

* * * * *